J. L. SHAW.
Railroad Water Tanks.
No. 137,388.
Patented April 1, 1873.
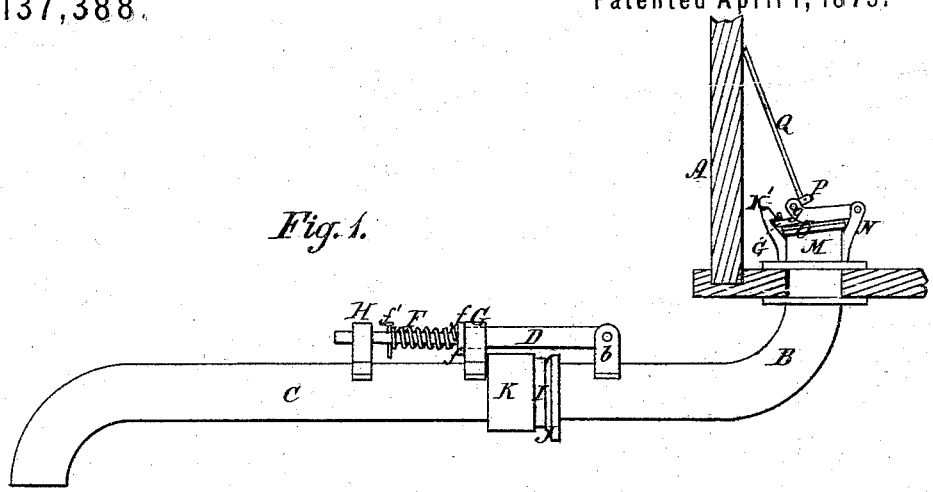
Fig. 1.
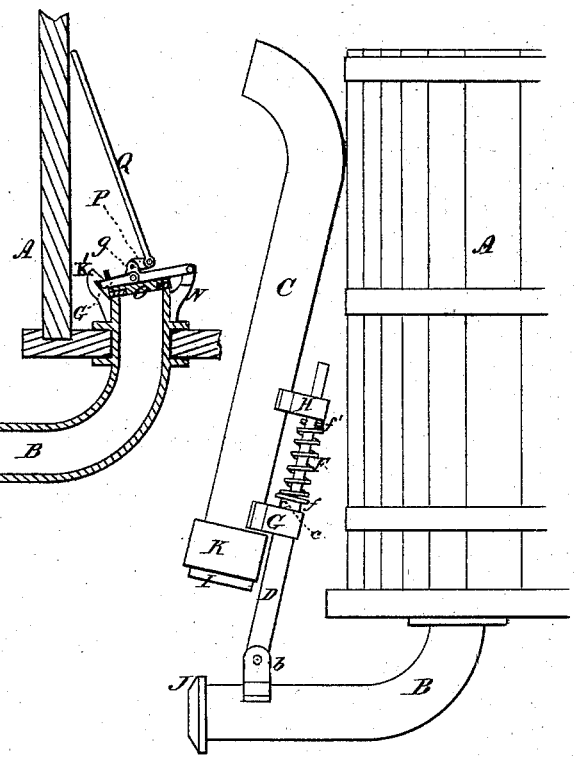
Fig. 2.
Fig. 3.
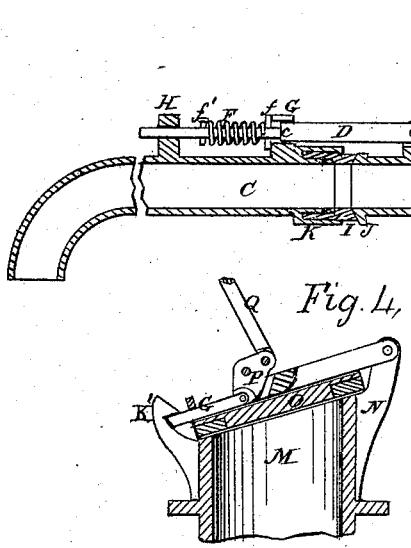
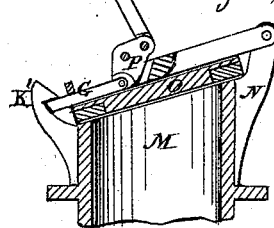
Fig. 4.
Witnesses:
J. West Wagner
Louis McPhillips
Inventor:
John L. Shaw,
By Johnson, Klaucke & Co
His Attorneys.

UNITED STATES PATENT OFFICE.

JOHN L. SHAW, OF GRAND RAPIDS, MICHIGAN.

IMPROVEMENT IN RAILROAD WATER-TANKS.

Specification forming part of Letters Patent No. 137,388, dated April 1, 1873; application filed February 17, 1873.

*To all whom it may concern:*

Be it known that I, JOHN L. SHAW, of Grand Rapids, in the county of Kent and State of Michigan, have invented a new and useful Improvement in Railroad Water-Tanks, of which the following is a specification:

This invention relates to water tanks or reservoirs designed for supplying locomotive-tenders with water; and my improvement therein consists in combining a spring with the fixed and movable sections of the discharge or supply pipe and a jointed bar connecting said sections, said spring being so arranged that when the connection between the two pipes is broken for arresting the discharge of water it shall remain dormant or inoperative, but when the pipes abut or are in contact with each other it will be brought into action by the weight of the delivery-pipe and caused to exert a pressure against the delivery-pipe for forcing the latter in contact with the fixed discharge-pipe, thus insuring, in connection with a projecting India-rubber packing-ring, a water-tight joint between the abutting ends of the discharge-pipe, the spring subserving also another important function of relieving the hinge of the sections of all injurious strain when the delivery-pipe is dropped or depressed, as it acts as a cushion for obviating such a result; also, in providing the movable section of the pipe, when hinged back of the joint, with a projecting rubber tubular bearing and packing, so that when said pipe is brought in line with the conical nipple of the fixed section the contact of the two will be a yielding rubbing action of the projecting rubber tube against the conical fixed end until the movable section is seated in line with the fixed section, and thereby obtain a sliding yielding joint. The invention also consists of a hinged valve, which is so arranged in relation to a discharge-aperture in the water-tank that, through the medium of a lever, elbow-crank, and bolt, said valve can be locked or closed and opened with facility.

In the accompanying drawing, Figure 1 represents an elevation of a supply-pipe embracing my invention. Fig. 2 represents a similar view, the pipe being shown turned up out of the way; Fig. 3, a vertical section of Fig. 1; Fig. 4, an enlarged view of the valve.

The ordinary water tank or reservoir from which the supply of water necessary for feeding the tender of a locomotive is derived is designated by A, and the stationary or fixed discharge-pipe usually combined with the tanks of this description is shown at B. The water is delivered or supplied to the tender by a pipe, C, which is, at the proper time, made to communicate with the stationary pipe B for producing a continuous conduit. The pipe C is carried by or attached to a hinged or jointed bar, D, which has its fulcrum or pivot point in ears or lugs $b$ on the stationary pipe B in rear of the junction of the two pipes. The rear portion of said hinged connecting-bar D is made square or angular and its front part round or cylindrical, for the purpose hereinafter described. A spiral spring, F, encompasses the cylindrical portion of the hinged connecting-bar, it being retained in position by any suitable means and combined with a washer or disk, $f$, against which it bears.

When the delivery or hinged pipe is not in use it is turned into a vertical position against the tank, the spring in this instance accomplishing no result, it being inoperative or dormant, as it presses between two shoulders, $c$ $f'$, on the bar.

In order to effect the unison of the two pipes for producing a continuous conduit extending to the tender of a locomotive it is only necessary to drop the supply-pipe, when the ends of the two respective pipes are caused to abut.

All strain or injury upon the hinge of the connecting-bar by the forcible depression of the delivery-pipe is obviated by the spring disposed as above described, for the same will act as a cushion for relieving or breaking the concussion caused by the fall and sudden contact of the pipes with each other. The spring, which has hitherto remained dormant or inoperative, is brought into action by the fall of the delivery-pipe, for the latter will, by its weight, cause the washer $f$, against which the spring bears, to be retracted from a shoulder, $c$, on the hinged bar, when it is immediately caused to exert a pressure upon a projecting ear or bracket, G, arranged near the rear end of the delivery-pipe for the passage of the hinged connecting-bar, and this passage or socket, being square, holds the bent end of the section C always in position to feed the tender.

This spring-pressure insures a sufficient horizontal movement of the delivery-pipe upon its connecting-bar, for forcing the same in contact with the adjacent end of the fixed discharge-pipe, thus producing a tight joint for preventing the escape of water from between the two pipes. A second bracket or suitable guide-block H is arranged on the delivery-pipe for receiving the front cylindrical portion of the hinged connecting-bar.

In order to insure a perfect seal, in addition to the spring I apply to the rear or abutting end of the hinged delivery-pipe a ring or gasket, I, of India rubber or other suitable material, which is retained in position in a seat or annular groove formed between an external collar or sleeve, K, and the external periphery of the delivery-pipe, so as to protrude therefrom. Said packing, when the delivery-pipe is depressed or dropped, is caused to expand by reason of its projection from its seat, when it comes in contact with the conical end portion or nipple J on the fixed discharge-pipe, thus effectually closing the joint. The delivery-pipe, when dropped, does not always come in the same relative position to the fixed pipe, but this is no obstacle to the effective operation of the packing and spring, but is rather an advantage, as the hinge, being located in the rear of the joint, and the supply section of the pipe supported on said hinge by a spring, the hinged section will seek its own seat by a sort of sliding motion upon the conical fixed end of the pipe.

At the bottom of the tank A is arranged a short thimble or valve-seat, M, provided with a flange for securing it in position, and with an arm, N, for receiving the horizontal hinged extremity of a stem or extension carried by the disk-valve O. To the upper side of said valve are applied vertical ears $g\ g$, between which is located and pivoted an elbow-crank, P, which carries a separate or detachably-applied bolt, G, at its lower end and a handle or pivoted lever, Q, at its upper end.

The bolt, when the valve is to be retained in its seat for arresting the discharge of water, is projected under or caused to engage with a hooked projecting arm, K', on the valve or thimble, thus firmly securing said valve. By a simple pull on the handle the bolt is disengaged from the retaining-hook through the medium of the bell-crank, thus enabling the valve to be raised for permitting the efflux of the water to take place. Instead of a bolt, as above described, the elbow-lever or crank may itself be formed or so shaped as to subserve the purpose of said bolt.

Any suitable device or appendages for elevating the delivery-pipe may be resorted to for causing the connection between the discharge-pipe to be cut off or broken in such a manner that any water remaining in the pipe will at once run out, leaving it clear and dry and thereby obviating all danger of its freezing or bursting. It will be seen that the square arm D and the square socket G serve to hold the section C from swiveling on its connection, and thus the curved nozzle c' is always retained in position to enter the tender-tank.

Having described my invention, I claim—

1. In combination with the fixed and movable sections of the supply-pipe, the hinged connecting-bar D and the spring F, or their equivalent, constructed and arranged for operation essentially as described.

2. In railway feed-water-tank pipes, the hollow protruding rubber mouth of the movable section C, arranged to slide upon the conical portion or nipple I of the other section B, to close the joint when the hinge of said sections is arranged as described.

3. The combination of the locking-bolt G, elbow-crank P, pivoted handle Q, and hinged valve O with the water-tank A and connecting-pipe sections B C, substantially as herein described.

4. In railway feed-water tanks having fixed and movable pipe-sections connected by a hinged bar, as described, the said connecting-bar D and the socket into which it fits made to hold the section C from swiveling upon its connecting-bar, as and for the purpose set forth.

JOHN L. SHAW.

Witnesses:
   OMAR H. SIMONDS,
   NIRAM A. FLETCHER.